US006721424B1

United States Patent
Radatti

(10) Patent No.: US 6,721,424 B1
(45) Date of Patent: Apr. 13, 2004

(54) HOSTAGE SYSTEM AND METHOD FOR INTERCEPTING ENCRYTED HOSTILE DATA

(75) Inventor: Peter V. Radatti, Conshohocken, PA (US)

(73) Assignee: CyberSoft, Inc, Conshohocken, PA (US)

( * ) Notice: Subject to any disclaimer, the term of this patent is extended or adjusted under 35 U.S.C. 154(b) by 0 days.

(21) Appl. No.: 09/377,311

(22) Filed: Aug. 19, 1999

(51) Int. Cl.[7] .............................................. G06F 1/26
(52) U.S. Cl. ...................... 380/286; 713/171; 713/189; 713/200; 713/201
(58) Field of Search ................................. 713/171, 189, 713/193, 200, 201; 380/286

(56) References Cited

U.S. PATENT DOCUMENTS 4,218,738 A  *  8/1980  Matyas et al. ................. 705/72
5,347,580 A  *  9/1994  Molva et al. ................. 713/159

OTHER PUBLICATIONS

Applied Cryptography: Protocols, Algorithms, and Source Code in C, 2nd Edition; Subchapter 4.14 "Key Escrow"—pp. 97–100; Bruce Schneier; Published: Oct. 1995.

* cited by examiner

Primary Examiner—Thomas R. Peeso

(57) ABSTRACT

A method for intercepting data transmissions in a system which is comprised of an external network and computers within a protected local network. A proxy server located in the communication path, between the external network and the computers, is equipped with virus detection capability and includes, also, key storage means and a hostage storage facility. If the proxy server determines that an incoming transmission from the external network contains hostile data, a key is obtained from the key storage means so as to decrypt the transmission. If no such key is available, the proxy server prevents the data transmission from entering the protected network and stores the data transmission as "hostage data" within the hostage storage facility until the intended user provides the proxy server with a key capable of decrypting the hostage data transmission.

4 Claims, 3 Drawing Sheets

HOSTAGE SYSTEM AND METHOD FOR INTERCEPTING ENCRYTED HOSTILE DATA

FIELD OF THE INVENTION

The present invention relates to a system and method for detecting and intercepting computer data transmissions containing hostile data, such as a virus. In particular, the present invention relates to such a system and method having a provision for enforcing a key escrow policy for storage of decryption keys, so that hostile data can be detected within encrypted data transmissions.

BACKGROUND OF THE INVENTION

Computer users and network administrators face a security dilemma in exchanging data between a computer or local network and an external network, such as the Internet. On the one hand, it is desirable to provide access to an external network, to permit e-mail, file transfers, and other forms of data transmission. On the other hand, completely unfettered access to an external network raises the possibility that hostile data may be received or sent to the external network. In this context, the term "hostile data" refers to any data that is undesired to be received from or sent to the external network. Such data may include virus-bearing data files or executables, which could damage a local user's computer or infect a local network. Hostile data can also include sensitive or proprietary information that is undesired to be sent from the user's computer or local network into an external network.

Virus detection is one form of hostile data interception that is of particular concern. In a known arrangement for protecting a local network from penetration by virus-bearing data, a proxy server is configured to mediate data exchanges between computers in the local network and the external network. At the proxy server, incoming transmissions of files or email from the external network are tested for the presence of viruses therein. If a virus is detected, the proxy server can be arranged to prevent transmission of the virus-bearing transmission to a destination within the local network. In some instances, incoming data transmissions may be encoded in a format requiring decoding prior to virus detection. Binary files, such as executables or images, may be compressed and/or encoded in formats such as UUENCODE, BINHEX, MIME, and SMIME, requiring the proxy server to de-compress or otherwise "unwrap" the encoded data prior to virus detection.

A significant vulnerability of the known network protection arrangement described above is that it is unable to detect the presence of hostile data within an encrypted data transmission. As used herein, an "encrypted" data transmission differs from an "encoded" data transmission in that extracting the original data from an "encrypted" data transmission requires external variable data in addition to a predetermined decryption algorithm, whereas, knowledge of a predetermined decoding algorithm alone is sufficient for extracting an "encoded" data transmission. Dual-key, or so-called "public-key" encryption is one such encryption method for providing secure or private data transmission. Dual or public key encryption systems are also referred to as asymmetric encryption, while single key encryption algorithms such as DES are known as symmetric encryption. In a dual-key encryption system, a user generates two bit sequences, or keys—a public key and a private key. The user publishes or otherwise makes the public key available to any entity from which the user desires to receive encrypted data, and the user retains the private key. The mathematical relationship between the two keys is sufficiently complex that the identity of the private key is not easily determined on the basis of knowledge of the public key, without consuming substantial computational resources. The public key can be used as a seed value in an algorithm for encrypting original data in such a manner that the encrypted data can be readily decrypted only if the private key is known. Upon receiving a data transmission that has been encrypted with the public key, the user provides the private key to a decryption algorithm for obtaining the original data.

Because knowledge of the private key is required to decrypt the encrypted transmission, a proxy server arranged to detect hostile data would not be able to decrypt the transmission unless the proxy server is provided with a copy of the private key. It would therefore be desirable to provide a system and method wherein a proxy server would be provided with copies of the private encryption keys of the users of a protected network in such a manner that intervention of a network administrator would not be required to ensure compliance with a key escrow policy. For computers having a direct connection to an external network, it would also be desirable to provide for a mechanism for prompting a user to provide a copy of his or her private key to a hostile data interception mechanism arranged to prevent access to data received via the network prior to completion of hostile data detection.

SUMMARY OF THE INVENTION

In accordance with one aspect of the present invention, there is provided a system and method wherein a proxy server is connected to provide a communication path between an external network and computers within a protected local network. The proxy server is arranged to detect the presence of hostile data within a data transmission received from the external network and addressed to a destination within the protected network. The proxy server is provided with a virus detection capability, a private key storage facility, and a hostage data storage facility. When a data transmission is received from the external network, the proxy server determines whether the data transmission has been encrypted. If the data transmission is determined to include encrypted data, the proxy server is arranged to retrieve, from the private key storage facility, a copy of the private key corresponding to the intended recipient of the data transmission. If no such private key is available, the proxy server prevents the data transmission as "hostage data" within the hostage data storage facility. Concurrently therewith or subsequent thereto, the proxy server generates a message to be sent to the intended recipient of the data transmission, to notify the recipient that the proxy server was unable to decrypt the data transmission, and prompting the recipient to provide a copy of the requisite decryption key to the proxy server. Thus, in accordance with the present invention, data transmissions are held "hostage" until the recipient user provides the proxy server with a key sufficient to decrypt the transmission and to proceed with the hostile data interception. This hostage-taking ability can be used equally well in asymmetric and symmetric systems.

BRIEF DESCRIPTION OF THE DRAWINGS

Additional aspects of the present invention shall be made apparent in the following detailed description in conjunction with the attached drawings in which.

DETAILED DESCRIPTION OF THE PREFERRED EMBODIMENT

Figure 1:
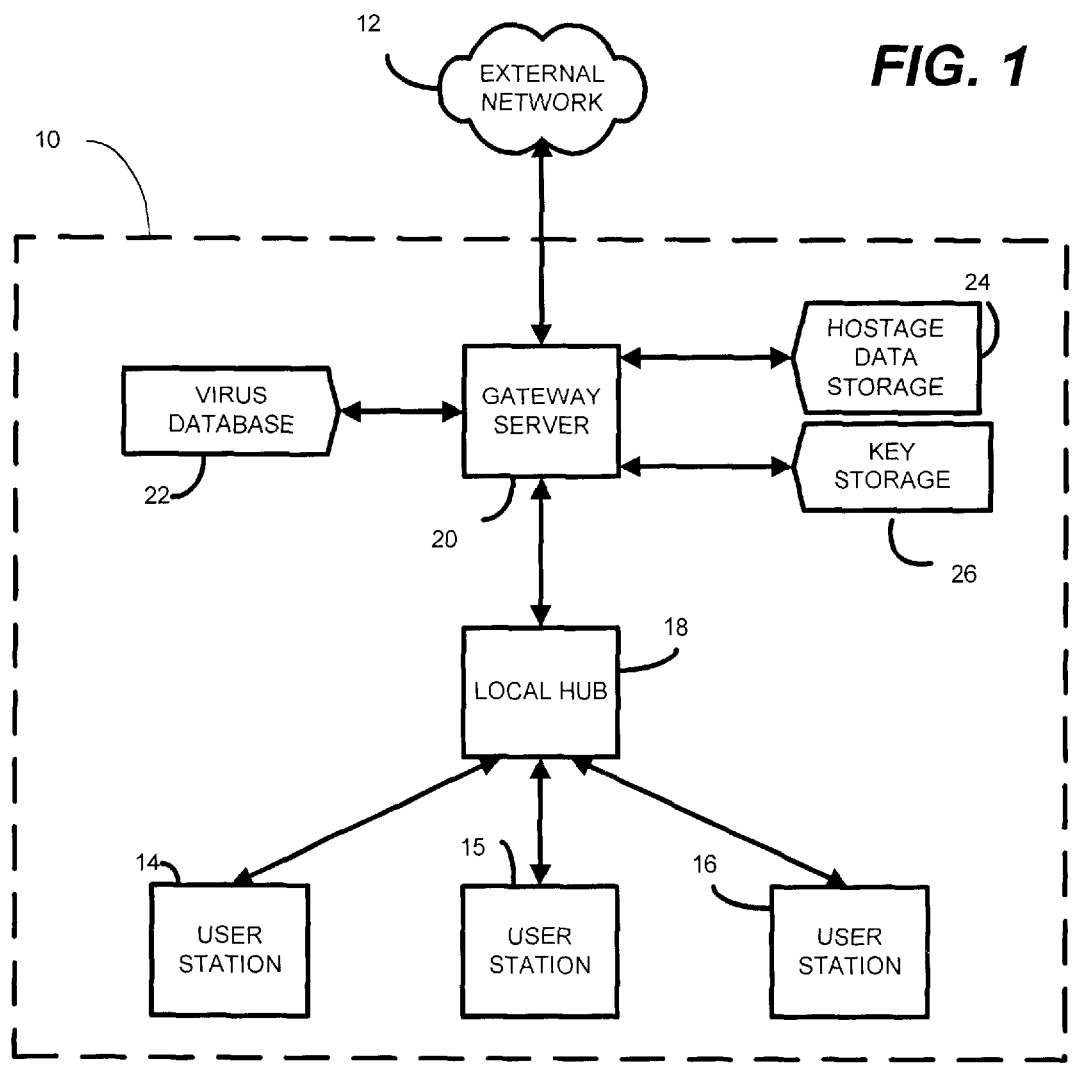
FIG. 1 is a functional block diagram of a local network connected via a proxy server to communicate with an-external network.

Referring now to FIG. 1, there is shown a computer network, such as a local-area network (LAN) 10, connected with an external network 12, such as the Internet. The LAN 10 comprises a plurality of computers, such as user stations 14, 15, and 16, which are connected with a local hub 18 for providing data communication among the user stations and other apparatus that may be connected with the LAN 10. In order to provide access to the external network from any of the user stations 14, 15, and 16, a computer designated, as a gateway server 20 is employed. The gateway server 20 is connected with other computers in the LAN 10, e.g., via local hub 18, and is configured to route data transfers (such as e-mail, file transfers, or other known protocols for network data transmission) from the user stations 14, 15, and 16 to the external network 12. The gateway server 20 is further configured to route data transfers from the external network 12 to the user stations 14, 15, and 16.

In order to protect computer within the LAN 10 from receiving hostile data from the external network 12, the gateway server 20 is configured to execute a hostile data detection process, such as a virus detection process. To that end, the gateway server 20 is provided with a virus database 22, such as may be provided with known types of virus detection software. In the hostile data detection process, the gateway server detects an incoming data transfer from the external network 12 destined for one of the user stations 14, 15, and 16. Because data may be transferred from the external network 12 in any of a number of formats, the virus detection process executed by the gateway server 20 can be arranged to decode such formatted data transfers. For example, binary files can be attached to e-mail messages in an ASCII format such as the popular UUENCODE, BINHEX, MIME or SMIME formats. When such a formatted data transfer is detected, the gateway server 20 first attempts to decode the encoded binary data into a form that can be processed by the virus detection process.

It may occur during the course of operation of the gateway server 20 that a user has requested a data transfer from the external network 12 in an encrypted format, such as an encrypted format requiring a decryption key. In order to detect the presence of hostile data within such a data transfer, the gateway server 20 is configured to enforce a key escrow policy for the LAN 10. Specifically, the gateway server 20 is configured to detect the presence of encrypted data within a data transfer from the external network 12 and to determine whether the gateway server 20 has been previously provided with a copy of the appropriate key for decrypting the data. If the key has not previously been provided to the gateway server 20, the incoming encrypted data is stored in a hostage data storage 24, and an appropriate message is generated and sent to the destination user station to request a copy of the decryption key. If the decryption key is subsequently provided to the gateway server 20, then the gateway server 20 retrieves the incoming data transfer from the hostage data storage 24, employs the key to decrypt the data transfer, performs virus detection on the decrypted data transfer, and stores the key in a key storage 26 for future use.

If no hostile data is detected in the decrypted data transfer, then the data is forwarded by the gateway server 20 through the LAN 10 to the destination user station.

Figure 2:
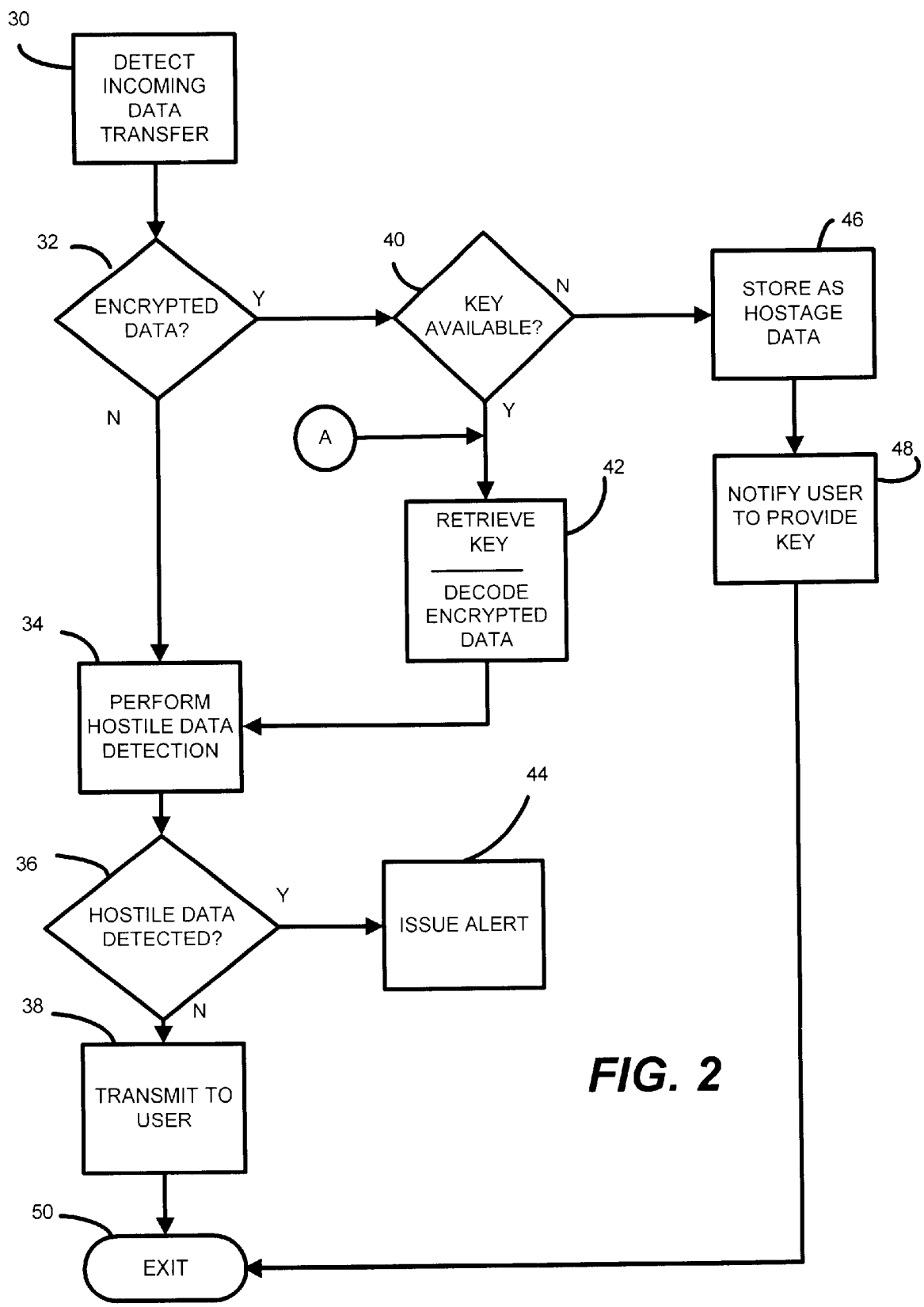
FIG. 2 is logical flow diagram showing a hostile data interception and key escrow enforcement method carried out by the proxy server of FIG. 1.

The hostile data detection and key escrow method performed by the gateway server shall now be described in greater detail with reference to FIG. 2. Beginning at step 30, the gateway server 20 executes a process to detect an incoming data transfer from the external network 12 to one of the user stations 14, 15, or 16 in the LAN 10. Then, in step 32, the gateway server 20 determines whether the data transfer detected in step 30 contains encrypted data. Such detection may be performed upon the data after any decoding, such as UUDECODE, BINHEX, MIME or SMIME decoding is performed on the data transfer. If no encrypted data is detected in step 32, the gateway server 20 proceeds to step 34. Otherwise, the gateway server proceeds to step 40.

At step 34, the incoming data transfer is compared with information contained in the virus database 22 in order to determine whether the incoming data transfer contains a virus. Then the gateway server 20 proceeds to step 36. At step 36, the gateway server proceeds to step 44 if a virus was detected in step 34. Otherwise, the gateway server proceeds to step 38.

At step 38, the gateway server forwards the incoming data transfer to the destination user station in the LAN 10 as specified by address information contained within the data transfer. The hostile data detection process then exits at step 50.

At step 44, a virus has been detected. The gateway server 20 issues an appropriate alert or otherwise takes action to prevent transmission of the virus to the destination of the data transfer. For example, the gateway server 20 may issue a message to the destination user station notifying the user that an incoming data transfer was determined to contain a virus. Alternatively, or in addition thereto, the gateway server 20 may notify a system administrator that an incoming data transfer has been determined to contain a virus. Then, the gateway server 20 may discard the data transfer or store the data transfer in an appropriate data storage location for later analysis. From step 44, the gateway server exits the hostile data detection process at step 50.

At step 40, the incoming data transfer has been determined to contain encrypted data. The gateway server 20 attempts to obtain a decryption key from the key storage 26 for decrypting the encrypted data. If no key is available for decrypting the data, then the gateway server 20 proceeds to step 46. Otherwise, if a key is available, the gateway server proceeds to step 42.

At step 42, the gateway server 20 retrieves the decryption key from the key storage 26, and decrypts the encrypted data. The gateway server then proceeds to step 34 to perform virus detection upon the decrypted data, in the manner described above.

At step 46, an encrypted message has been received, and it has been determined that an appropriate decryption key is not available in the key storage 26. The gateway server 20 stores the encrypted data in a hostage data storage area 24 for temporarily holding data that cannot be decrypted with any of the available keys in the key storage 26. The gateway server then proceeds to step 48.

At step 48, the gateway server 20 generates a message signifying that encrypted data has been received, by no key is available to decrypt the data in order to perform virus detection. For example, the gateway server 20 may generate an e-mail message to the user for whom the data transfer is destined, requesting the user to respond to the message by sending the appropriate key to the gateway server 20. The gateway server 20 then exits at step 50 without having forwarded the "hostage" data to the destination user station.

Figure 3:
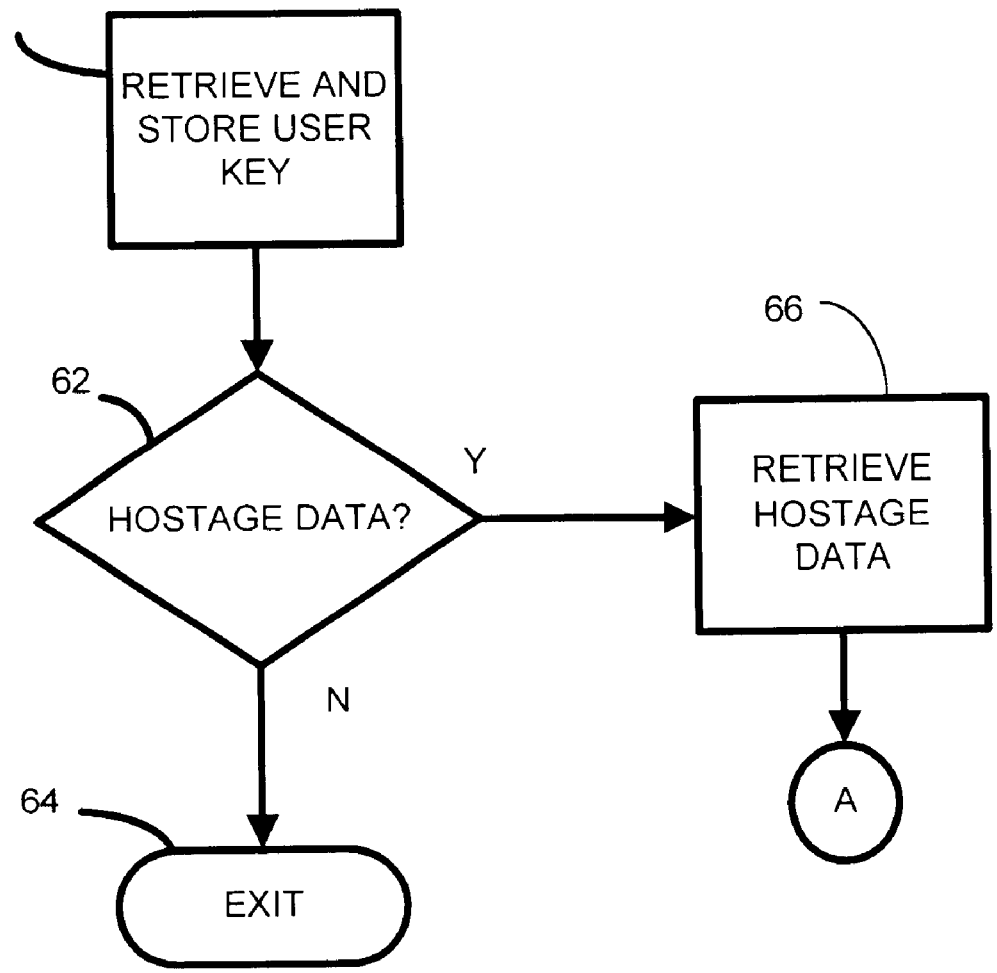
FIG. 3 is a logical flow diagram showing a method of the proxy server in response to receiving a private key from a user for escrow.

Upon receiving a notification such as that issued in step 48 of the hostile data detection process, a user at one of the user stations 14, 15, or 16 may respond by sending a copy of his or her decryption key to the gateway server 20 in order to receive the data transfer that is being held in the hostage data storage 24. The gateway server 20 is configured to recognize such responses, or other messages from the user stations 14, 15, and 16 containing decryption keys, and to perform the process shown in FIG. 3 upon receipt of such a response. Beginning at step 60, the gateway server 20 obtains the user's decryption key from said user station and stores the key in the key storage 26. Then the gateway server 20 proceeds to step 62.

At step 62, the gateway server 20 queries the hostage data storage 24 in order to determine whether any incoming data transfers are being held pending receipt of an appropriate decryption key. If no such hostage data is being held, the gateway server 20 exits the key escrow procedure at step 64, having stored the user's key in the key storage 26 for future use. If it is determined in step 62 that hostage data is being held corresponding to the key received in step 60, then the gateway server 20 proceeds to step 66.

At step 66, the gateway server 20 retrieves any hostage data from the hostage data storage 24 corresponding to the decryption key received in step 60. Then, the gateway server 20 proceeds to step 42 of the hostile data detection process, as indicated by the label A in FIGS. 2 and 3.

The terms and expressions which have been employed herein are used as terms of description and not of limitation. There is no intention in the use of such terms and expressions of excluding any equivalents of the features shown and described or portions thereof. It is recognized, however, that various modifications are possible within the scope of the invention as claimed. For example, there has been described a preferred embodiment with reference to virus detection. It should be understood that such a method and system may be implemented for the detection of undesired or hostile data transmissions of various kinds such as unauthorized reception of proprietary or classified information, as well as data transfers containing executable components capable of producing unexpected or undesired results upon execution.

What is claimed is:

1. A method for enforcing encryption key escrow in a protected network, comprising:

providing a server having a first connection to an external source of data, a second connection with the protected network, and a key escrow means;

monitoring said first connection for a data transmission intended for a destination within the protected network at the server;

determining whether the data transmission includes encrypted data; and if said data transmission includes encrypted data, determining whether an encryption key for decrypting said data is stored in the key escrow means; and preventing further transmission of the data transmission to the destination unless an encryption key associated with the destination is provided to the key escrow means.

2. The method of claim 1, further comprising:

storing said data transmission until the encryption key is provided to the key escrow means;

retrieving said data transmission upon receipt of the encryption key;

decrypting said data transmission using the encryption key;

determining whether the data transmission includes hostile data; and transmitting said data transmission to the destination of the data transmission does not include hostile data.

3. The method of claim 1, which further comprises:

generating an e-mail message to a user at the intended destination; and requesting said user to provide an appropriate user's key for decrypting said data transmission.

4. The method of claim 3, which further comprises storing said user's key in said key escrow means once decryption has been accomplished.

* * * * *